United States Patent
Ho et al.

(10) Patent No.: US 9,052,557 B2
(45) Date of Patent: Jun. 9, 2015

(54) PIXEL ARRAY, PIXEL STRUCTURE, AND DRIVING METHOD OF A PIXEL STRUCTURE

(75) Inventors: Sheng-Ju Ho, Hsinchu (TW); Cheng-Han Tsao, New Taipei (TW); Chung-Yi Chiu, Tainan (TW); Chao-Yuan Chen, Hsinchu County (TW); Wen-Hao Hsu, Hsinchu County (TW); Peng-Bo Xi, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 806 days.

(21) Appl. No.: 13/167,689

(22) Filed: Jun. 23, 2011

(65) Prior Publication Data
US 2012/0262430 A1    Oct. 18, 2012

(30) Foreign Application Priority Data

Apr. 13, 2011   (TW) .............................. 100112817 A

(51) Int. Cl.
| | | |
|---|---|---|
| *G02F 1/1362* | (2006.01) | |
| *G09G 3/00* | (2006.01) | |
| *G09G 3/36* | (2006.01) | |

(52) U.S. Cl.
CPC ............ *G02F 1/13624* (2013.01); *G09G 3/003* (2013.01); *G09G 3/3659* (2013.01); *G09G 2300/0852* (2013.01); *G09G 2310/06* (2013.01)

(58) Field of Classification Search
CPC ....... G02F 1/133; G02F 1/13624; G09G 1/00; G09G 3/3648; G09G 2300/08; G09G 2300/0804
See application file for complete search history.

(56) References Cited

U.S. PATENT DOCUMENTS

| | | | |
|---|---|---|---|
| 7,796,221 | B2 | 9/2010 | Kamada et al. |
| 8,026,991 | B2 * | 9/2011 | Um et al. .......................... 349/46 |
| 2006/0023137 | A1 * | 2/2006 | Kamada et al. ................. 349/44 |
| 2007/0064164 | A1 * | 3/2007 | Tasaka et al. ................... 349/38 |

FOREIGN PATENT DOCUMENTS

TW    I291675    12/2007

OTHER PUBLICATIONS

"Office Action of Taiwan Counterpart Application", issued on May 27, 2014, p. 1-p. 4.

* cited by examiner

Primary Examiner — Michael Faragalla
(74) Attorney, Agent, or Firm — Jianq Chyun IP Office

(57) ABSTRACT

A pixel array, a pixel structure, and a driving method of a pixel structure are provided. The pixel structure includes a first scan line, a second scan line, a first common electrode line, a data line, a first active device, a second device, a first pixel electrode, and a second pixel electrode. The data line is intersected with the first scan line and the second scan line. The first active device is driven by the first scan line and connected to the data line. The second active device is driven by the second scan line and connected to the first common electrode line. The first pixel electrode is electrically connected to the data line through the first active device. The second pixel electrode is electrically connected to the data line through the first active device and electrically connected to the first common electrode line through the second active device.

23 Claims, 12 Drawing Sheets

PIXEL ARRAY, PIXEL STRUCTURE, AND DRIVING METHOD OF A PIXEL STRUCTURE

CROSS-REFERENCE TO RELATED APPLICATION

This application claims the priority benefit of Taiwan application serial no. 100112817, filed on Apr. 13, 2011. The entirety of the above-mentioned patent application is hereby incorporated by reference herein and made a part of this specification.

BACKGROUND OF THE INVENTION

1. Technical Field

The disclosure relates to a pixel array, a pixel structure and a driving method thereof, and particularly to a pixel structure capable of performing a three-dimensional (3D) display mode, a pixel array having the pixel structure, and a driving method of the pixel structure.

2. Description of Related Art

The display methods of 3D images have been commercialized and introduced into the products with the vigorous development of the displays. It is considered that the 3D display devices become an important developing trend of the displays in the next generation. The 3D display devices are gradually required in the markets of various fields such as medical field, exhibition field, commercial field, education field, military field, design field, and the like.

Nevertheless, the problem for commercializing the 3D displays into the products lies in that the image quality thereof, such as the viewing angles, the numbers of the users capable of watching the 3D images, and the like, which fails to satisfy the demands of the user as well as the 2D displays. Particularly, the serious problem negatively influencing the 3D display effect is the occurrence of cross-talk between stereo images.

FIG. 1 schematically illustrates the 3D display technique. Referring to FIG. 1, the pixels 110 in the display 100 are generally divided into left-eye pixels 112 and right eye pixels 114 based on the 3D display technique, wherein the images displayed by the left-eye pixels 112 and the right-eye pixels 114 are different. The left eye L and the right eye (not shown) of a user can respectively receives the images displayed by the left-eye pixels 112 and the images displayed by the right-eye pixels 114, and then construct a 3D image in his or her brain.

However, the left-eye pixels 112 and the right-eye pixels 114 are adjacent to each other. Inevitably, in addition to receiving the images displayed by the left-eye pixels 112, the left eye L can also receive the images displayed by the right-eye pixels 114, which causes the phenomenon of cross talk between stereo images. For preventing the phenomenon of cross talk between stereo images, a light shielding pattern 120 is usually disposed between the left-eye pixels 112 and the right-eye pixels 114. It is noted that the larger the shielding area of the light shielding pattern 120, the smaller the display area of the display 100. Accordingly, the display aperture of the display 100 is significantly restricted when performing the two-dimensional (2D) display mode. That is to say, for achieving desirable display quality in the 3D display mode, the display quality of the display 100 in the 2D display mode must be sacrificed.

SUMMARY OF DISCLOSURE

The disclosure provides a pixel structure having two pixel electrodes, wherein the two pixel electrodes both display the images in the 2D display mode and one of the pixel electrodes can display a dark image through the control of the active device in the 3D display mode for serving as a light shielding pattern, such that great display effect can be achieved.

The disclosure provides a driving method of a pixel structure, wherein the active devices are turned on according to different time series so that one of the pixel electrodes in the pixel structure can selectively display a dark image or a predetermined gray level, thereby the problem of cross talk between stereo images can be eliminated.

The disclosure provides a pixel array including a plurality of pixel structures arranged in an array and each pixel structure has three pixel electrodes, such that the three pixel electrodes can display at least two image brightness in the 2D display mode, and at least one of the three pixel electrodes can display a dark image while the other two display different brightness in the 3D display mode, thereby the display quality in the 3D display mode can be enhanced.

The disclosure directs to a pixel structure including a first scan line, a second scan line, a first common electrode line, a data line, a first active device, a second active device, a first pixel electrode, and a second pixel electrode. The data line intersects with the first and the second scan lines. The first active device is driven by the first scan line and electrically connected to the data line. The second active device is driven by the second scan line and electrically connected to the first common electrode line. The first pixel electrode is electrically connected to the data line through the first active device. The second pixel electrode is electrically connected to the data line through the first active device and electrically connected to the first common electrode line through the second active device.

The disclosure also directs to a driving method of a pixel structure. The pixel structure includes a first scan line, a second scan line, a first common electrode line, a data line, a first active device, a second active device, a first pixel electrode, and a second pixel electrode. The data line intersects with the first and the second scan lines. The first active device is driven by the first scan line and electrically connected to the data line. The second active device is driven by the second scan line and electrically connected to the first common electrode line. The first pixel electrode is electrically connected to the data line through the first active device. The second pixel electrode is electrically connected to the data line through the first active device and electrically connected to the first common electrode line through the second active device. The driving method of the pixel structure includes: in a 2D display mode, turning on the first active device through the first scan line such that a display voltage is applied to the first pixel electrode and the second pixel electrode from the data line; and in a 3D display mode, turning on the first active device through the first scan line such that the first display voltage is applied to the first pixel electrode and the second pixel electrode from the data line, and subsequently turning on the second active device through the second scan line such that a common voltage is applied to the second pixel electrode from the first common electrode line.

The disclosure further directs to a driving method of a pixel structure. The pixel structure includes a first scan line, a second scan line, a data line, a first active device, a second active device, a first pixel electrode, and a second pixel electrode. The data line intersects with the first and the second scan lines. The first active device is driven by the first scan line and electrically connected to the data line. The second active device is driven by the second scan line and electrically connected to the data line. The first pixel electrode is electrically connected to the data line through the first active device. The second pixel electrode is electrically connected to the data line through the second active device. The driving method of the pixel structure includes: in a 2D display mode, simultaneously turning on the first active device and the second active device through the first scan line and the second scan line such that a display voltage is applied to the first pixel electrode and the second pixel electrode from the data line; and in a three-dimensional (3D) display mode, turning on the first active device and the second active device through the first scan line and the second scan line at an $n^{th}$ frame time such that the display voltage is applied to the first pixel electrode and the scone pixel electrode from the data line, and turning on one of the first active device and the second active device through one of the first scan line and the second scan line at an $(n+1)^{th}$ frame time such that a dark voltage is applied to one of the first pixel electrode and the second pixel electrode from the data line, wherein the other one of the first active device and the second active device is turned off at the $(n+1)^{th}$ frame time.

The disclosure still directs to a pixel array including a plurality of pixel structures arranged in an array. Each of the pixel structures includes a first scan line, a second scan line, a first common electrode line, a first data line, a second data line, a first active device, a second active device, a third active device, a first pixel electrode, a second pixel electrode, and a third pixel electrode. The first and the second data lines intersect with the first and the second scan lines. The first active device is driven by the first scan line and electrically connected to the first data line. The second active device is driven by the second scan line. The third active device is driven by the first scan line and electrically connected to the second data line. The first pixel electrode is electrically connected to the first data line through the first active device. The second pixel electrode is electrically connected to the first data line through the first active device. The third pixel electrode is electrically connected to the second data line through the third active device, wherein the first pixel electrode is located between the second pixel electrode and the third pixel electrode.

In view of the above, the pixel structure according to the disclosure is configured with two or three pixel electrodes arranged in parallel, wherein at least one of the pixel electrodes displays the dark image in the 3D display mode. Accordingly, the pixel electrode displaying the dark image is served as the light shielding pattern between two adjacent pixel structures in the 3D display mode, such that the problem of cross talk between stereo images can be prevented. In addition, when the pixel structure has three pixel electrodes, the two pixel electrodes which do not display the dark image can have different display voltages in the 3D display mode. Thereby, the pixel structure having three pixel electrodes can have high resolution in the 3D display mode or can be prevented from the problems of color shift and color washout at large view angle. Furthermore, all pixel electrodes in the pixel structure can display the corresponding gray levels in the 2D display mode so that desirable display aperture is provided. Namely, the pixel structure according to the invention can have desirable display aperture in the 2D display mode and desirable display effect in the 3D display mode.

In order to make the aforementioned and other features and advantages of the disclosure more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
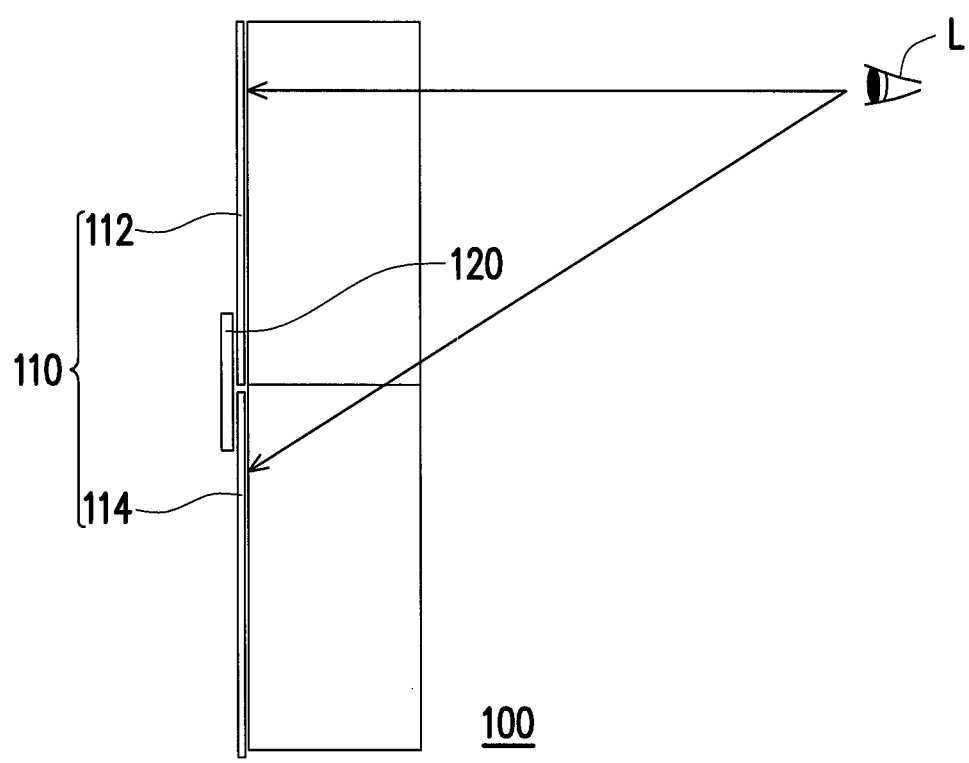
FIG. 1 is the 3D display technique.
Figure 2:
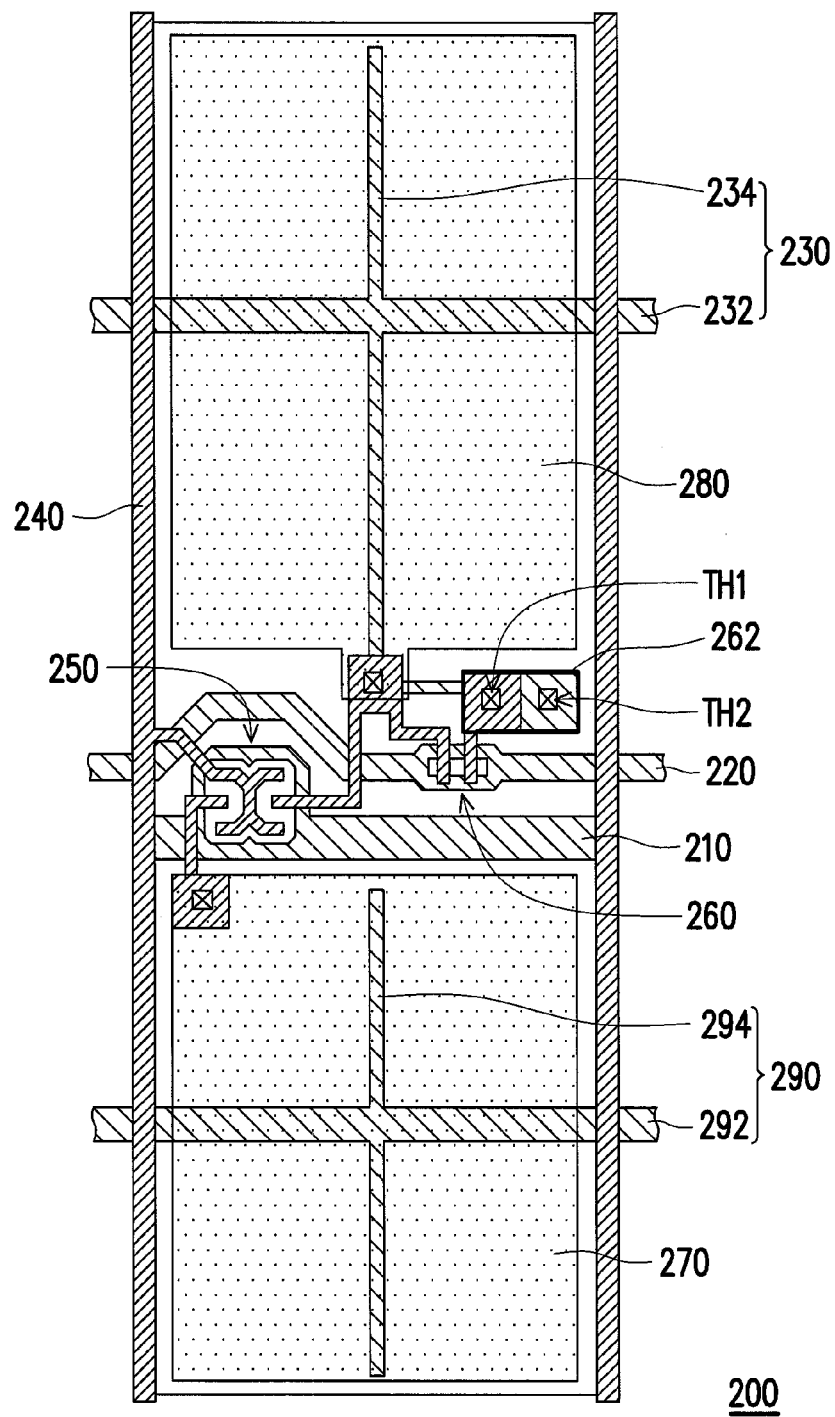
FIG. 2 is a schematic view of a pixel structure according to a first embodiment.

FIG. 2 is a schematic view of a pixel structure according to a first embodiment. Referring to FIG. 2, the pixel structure 200 includes a first scan line 210, a second scan line 220, a first common electrode line 230, a data line 240, a first active device 250, a second active device 260, a first pixel electrode 270, and a second pixel electrode 280. The data line 240 intersects with the first and the second scan lines 210 and 220. The first active device 250 is driven by the first scan line 210 and electrically connected to the data line 240. The second active device 260 is driven by the second scan line 220 and electrically connected to the first common electrode line 230. The first pixel electrode 270 is electrically connected to the data line 240 through the first active device 250. The second pixel electrode 280 is electrically connected to the data line 240 through the first active device 250 and electrically connected to the first common electrode line 230 through the second active device 260.

Figure 3:
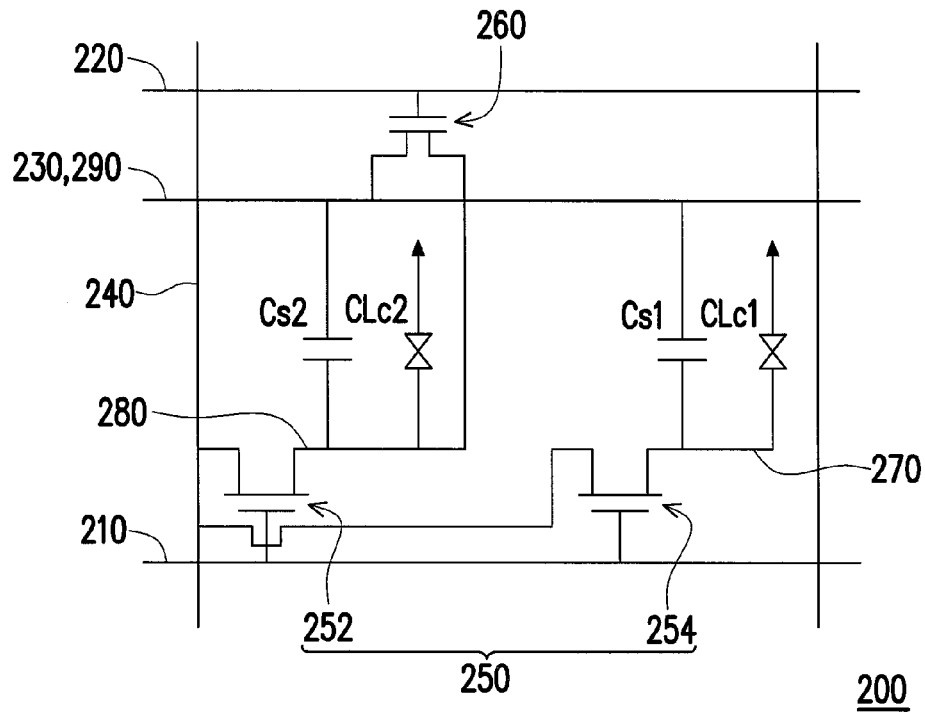
FIG. 3 is an equivalent circuit diagram of the pixel structure in FIG. 2.

FIG. 3 illustrates an equivalent circuit diagram of the pixel structure in FIG. 2. Referring to FIG. 2 and FIG. 3 simultaneously, when the pixel structure 200 is applied in a liquid crystal display panel, the first pixel electrode 270 and the opposite electrode configured in the liquid crystal display panel construct the liquid crystal capacitance Clc1, and the second pixel electrode 280 and the opposite electrode configured in the liquid crystal display panel construct another liquid crystal capacitance Clc2. In the design of the structure, the first common electrode line 230 overlaps the second pixel electrode 280 to form the storage capacitance Cs2. In addition, the pixel structure 200 further includes a second common electrode line 290 which overlaps the first pixel electrode 270 to form another storage capacitance Cs1. The first common electrode line 230 and the second common electrode line 290 can be connected to a same voltage such as a common voltage, so that the first common electrode line 230 and the second common electrode line 290 are represented by the same line in FIG. 3.

In addition, the first common electrode line 230 has a main trunk 232 and a branch 234. The main trunk 232 is substantially parallel to the first scan line 210 and connected with the branch 234 to form a cross. The second active device 260 is connected with a terminal of the branch 234. The second common electrode line 290 can also have a main trunk 292 and a branch 294, wherein the main trunk 292 is substantially parallel to the first scan line 210 and connected with the branch 294 to form another cross.

Specifically, in an alternative embodiment, the first common electrode line 230 and the second common electrode line 290 can be respectively formed by a fence pattern (having a main trunk and a plurality of branches intersected with the main trunk), a U shape pattern (surrounding the periphery of the pixel electrode), or other patterns. The above-mentioned cross as shown in FIG. 2 is only exemplary and not intended to limit the present invention.

Furthermore, for electrically connecting the second active device 260 to the first common electrode line 230, the pixel structure 200 in the present embodiment is configured with a transparent connecting layer 262 which connects the source of the second active device 260 and the first common electrode line 230 through the through holes TH1 and TH2. Nevertheless, the present invention should not be construed as limited to the embodiments set forth herein. Any connection method capable of electrically connecting the second active device 260 to the first common electrode line 230 can be applied in the invention. Additionally, as shown in FIG. 2, the first active device 250 can be a dual drain thin film transistor, and the two drains of the first active device 250 can be respectively electrically connected to the first pixel electrode 270 and the second pixel electrode 280. However, as shown in FIG. 3, the pixel structure 200 can use two transistors 252 and 254 to connect the first pixel electrode 270 and the second pixel electrode 280 to the data line 240, respectively. Herein, the two transistors 252 and 254 are controlled by the first scan line 210 and connected with the data line 240.

In the present embodiment, the first pixel electrode 270 is located between the second pixel electrode 280 and a second pixel electrode 280 of a previous or a next pixel structure 200. In addition, the first scan line 210 and the second scan line 220 can be disposed between the first pixel electrode 270 and the second pixel electrode 280. Namely, the first pixel electrode 270 and the second pixel electrode 280 can be arranged in parallel to each other in the pixel structure 200. Accordingly, one of the first pixel electrode 270 and the second pixel electrode 280 displaying a dark image can provide the light shielding effect as a light shielding pattern between two adjacent pixel structures 200. Herein, the pixel structure 200 can have desirable 3D display effect when performing the 3D display mode, wherein the phenomenon of cross talk between stereo images is not liable occurred.

Figure 4:
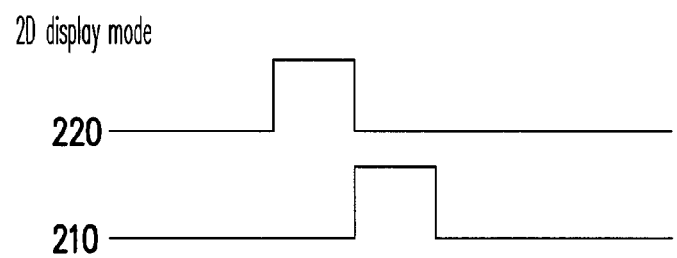
FIG. 4 is the driving waveform diagrams of the first scan line and the second scan line of the pixel structure in FIG. 2 in the 2D display mode and the 3D display mode.
Figure 4:
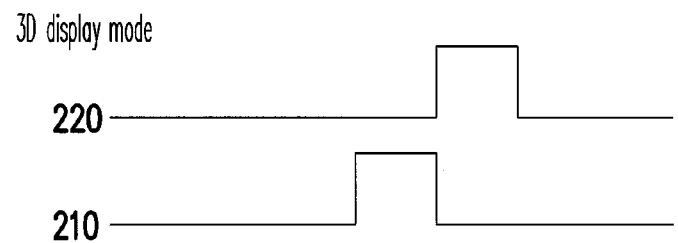

FIG. 4 illustrates the driving waveform diagrams of the first scan line and the second scan line of the pixel structure in FIG. 2 in the 2D display mode and the 3D display mode. Referring to FIG. 2 to FIG. 4, the driving method of the pixel structure 200 includes, but does not limit to, the following steps. The driving method according to the present embodiment includes turning on the second active device 260 through the second scan line 220 in the 2D display mode, such that a common voltage is applied to the second pixel electrode 280 from the first common electrode line 230. Next, the first active device 250 is turned on through the first scan line 210 such that a display voltage is applied to the first pixel electrode 270 and the second pixel electrode 280 from the data line 240.

Accordingly, the first pixel electrode 270 is merely applied by the display voltage while the second pixel electrode 280 is applied by the common voltage and the display voltage sequentially at the same frame time. The time period the second pixel electrode 280 has the common voltage is substantially as short as the enable time period of the second scan line 220, so that the user would not feel the displayed image in the second pixel electrode 280 breaking off when watching the image displayed by the pixel structure 200. Namely, the image displayed by the first pixel electrode 270 and the second pixel electrode 280 of the pixel structure 200 can be continuous in the 2D display mode.

Moreover, in the 3D display mode, the first active device 250 is firstly turned on by the first scan line 210 and the display voltage is applied to the first pixel electrode 270 and the second pixel electrode 280 from the data line 240 based on the driving method of the pixel structure 200. Subsequently, the second active device 260 is turned on through the second scan line 220 such that the common voltage is applied to the second pixel electrode 280 from the first common electrode line 230.

Accordingly, the first pixel electrode 270 is merely applied by the display voltage while the second pixel electrode 280 is applied by the display voltage and the common voltage sequentially at the same frame time. The time period the second pixel electrode 280 has the display voltage is substantially as short as the enable time period of the first scan line 210, so that the second pixel electrode 280 substantially continuously displays a dark image when the user watches the image displayed by the pixel structure 200. That is to say, the second pixel electrode 280 does not display the predetermined image in the 3D display mode. The second pixel electrode 280 is located between the first pixel electrode 270 and a previous or a next pixel structure 200, so that the second pixel electrode 280 can be served as the light shielding pattern between two pixel structures 200. Herein, the area of the light shielding pattern is large enough to eliminate the phenomenon of cross talk between stereo images when the pixel structure 200 performs the 3D display mode.

In other words, merely modulating the scanning sequence of the scan lines 210 and 220 can the pixel structure 200 have desirable light shielding effect in the 3D display mode according to the present embodiment. Additionally, both the first pixel electrode 270 and the second pixel electrode 280 of the pixel structure 200 can display the predetermined image in the 2D display mode, such that the pixel structure 200 has desirable display aperture ratio in the 2D display mode. Consequently, the pixel structure 200 not only has good 3D display effect, but also has good 2D display quality.

Figure 5:
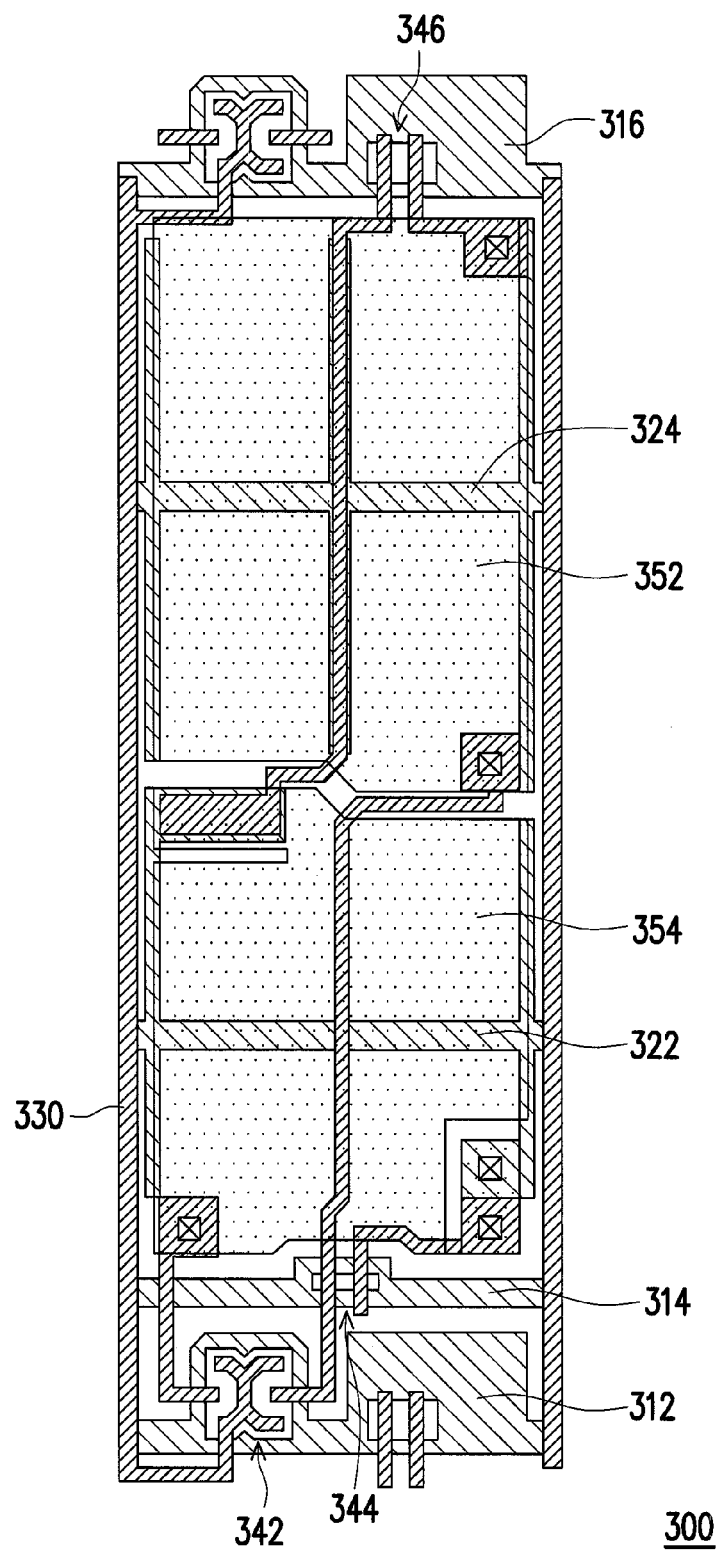
FIG. 5 is a schematic view of a pixel structure according to a second embodiment.
Figure 6:
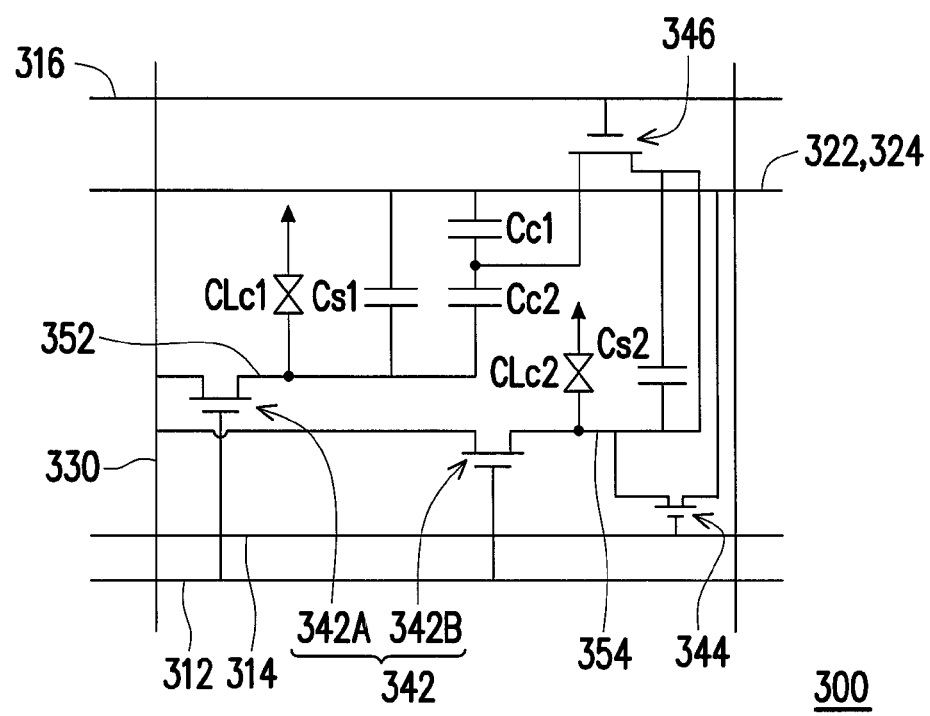
FIG. 6 is an equivalent circuit diagram of the pixel structure in FIG. 5.

FIG. 5 is a schematic view of a pixel structure according to a second embodiment and FIG. 6 illustrates an equivalent circuit diagram of the pixel structure in FIG. 5. Referring to FIG. 5 and FIG. 6, the pixel structure 300 includes a first scan line 312, a second scan line 314, a third scan line 316, a first common electrode line 322, a data line 330, a first active device 342, a second active device 344, a third active device 346, a first pixel electrode 352, and a second pixel electrode 354. In the present embodiment, the first active device 342 can be a dual drain thin film transistor or formed by two transistors 342A and 342B as shown in FIG. 6.

The data line 330 intersects with the first, the second, and the third scan lines 312, 314, and 316. The first active device 342 is driven by the first scan line 312 and electrically connected to the data line 330. The second active device 344 is driven by the second scan line 314 and electrically connected to the first common electrode line 322. The first pixel electrode 352 is electrically connected to the data line 330 through the first active device 342. The second pixel electrode 354 is electrically connected to the data line 330 through the first active device 342 and electrically connected to the first common electrode line 322 through the second active device 344. Furthermore, the third active device 346 is driven by the third scan line 316, electrically connected to the first pixel electrode 352, and coupled with the second pixel electrode 354. In specific, the drain of the third active device 346 is coupled with the first common electrode line 322 and the second pixel electrode 354 through the coupling capacitance Cc1 and the coupling capacitance Cc2, respectively.

The third active device 346 according to the present embodiment is configured for redistributing the voltages of the first pixel electrode 352 and the second pixel electrode 354, such that the pixel structure 300 can have desirable display effect. Herein, the third scan line 316 can be a first scan line 312 of a next pixel structure 300 when a plurality of pixel structures 300 forms a pixel array. Based on the layout of the pixel structure 300, the display voltage transmitted by the data line 330 can be applied to the first pixel electrode 352 and the second pixel electrode 354 after the first active device 342 is turned on by the first scan line 312. Thereafter, the first scan line 312 of the next pixel structure 300, i.e. the third scan line 316, is enabled to turn on the third active device 346 so that the voltages of the first pixel electrode 352 and the second pixel electrode 354 are redistributed. According to the display method, the pixel structure 300 can have desirable display quality.

In the present embodiment, the pixel structure 300 further includes a second common electrode line 324 which overlaps the first pixel electrode 352 to form the storage capacitance Cs1. The second pixel electrode 354 overlaps the first common electrode line 322 to form another storage capacitance Cs2. In addition, when the pixel structure 300 is applied in a liquid crystal display panel, the first pixel electrode 352 and the opposite electrode configured in the liquid crystal display panel construct the liquid crystal capacitance Clc1, and the second pixel electrode 354 and the opposite electrode configured in the liquid crystal display panel construct another liquid crystal capacitance Clc2.

As shown in FIG. 5, the second pixel electrode 354 is located between the second scan line 314 and the first pixel electrode 352, and the second scan line 314 is located between the second pixel electrode 354 and the first scan line 312. The second pixel electrode 354 is located between the first pixel electrode 352 and a first pixel electrode 352 of a previous or next pixel structure 300. In other words, the first pixel electrode 352 and the second pixel electrode 354 are arranged in parallel in the present embodiment.

Figure 7A:
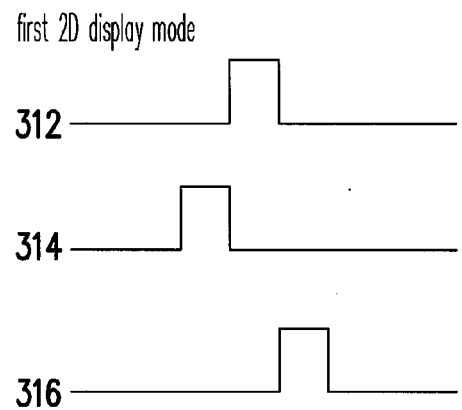
FIG. 7A is the driving waveform diagram of the scan line of the pixel structure in FIG. 5 in a first 2D display mode.
Figure 7B:
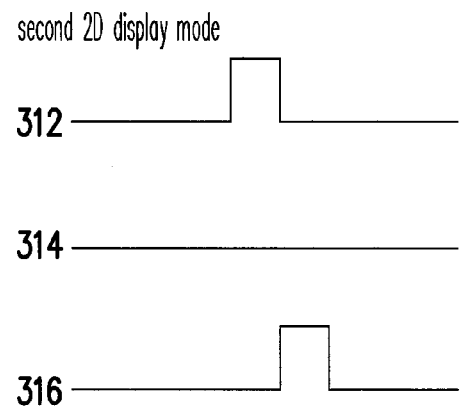
FIG. 7B is the driving waveform diagram of the scan line of the pixel structure in FIG. 5 in a second 2D display mode.
Figure 8:
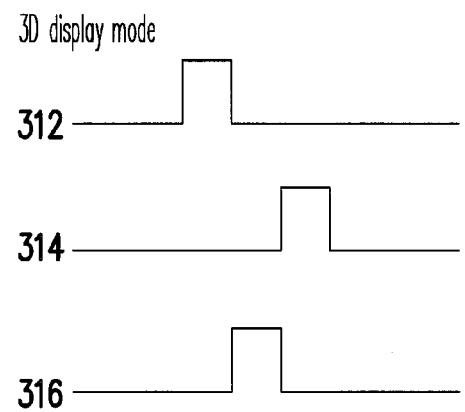
FIG. 8 is the driving waveform diagram of the scan line of the pixel structure in FIG. 5 in a 3D display mode.

FIG. 7A illustrates the driving waveform diagram of the scan line of the pixel structure in FIG. 5 in a first 2D display mode and FIG. 7B illustrates the driving waveform diagram of the scan line of the pixel structure in FIG. 5 in a second 2D display mode. FIG. 8 illustrates the driving waveform diagram of the scan line of the pixel structure in FIG. 5 in a 3D display mode. Referring to FIGS. 5, 6, and 7A, the driving method of the pixel structure 300 in the first 2D display mode includes turning on the second active device 344 through the second scan line 314, such that a common voltage is applied to the second pixel electrode 354 from the first common electrode line 322. Next, the first active device 342 is turned on through the first scan line 312, such that a display voltage is applied to the first pixel electrode 352 and the second pixel electrode 354 from the data line 330. Now, the second pixel electrode 354 can have the display voltage rather than the common voltage. Thereafter, the third active device 346 is turned on by the third scan line 316, so that the voltages of the first pixel electrode 352 and the second pixel electrode 354 are redistributed.

In the first 2D display mode, the driving method of the pixel structure 300 can include enabling the second scan line 314, the first scan line 312, and the third scan line 316 sequentially. Accordingly, the second pixel electrode 314 is though applied by the common voltage and the display voltage in turn, the time period the second pixel electrode 314 has the common voltage is quite short, as short as the enable time period of the second scan line 314, and thus the second pixel electrode 354 can display the predetermined image, but not the dark image. Namely, the first pixel electrode 352 and the second pixel electrode 354 both provide the image display function when the user watches the image displayed by the pixel structure 300.

Alternatively, referring to FIGS. 5, 6, and 7B, the second scan line 314 is not enabled according to the driving method of the pixel structure 300 in the second 2D display mode. That is to say, merely enabling the first scan line 312 and the third scan line 316 can the 2D display function be performed according to the present embodiment. Specifically, the first scan line 312 is firstly enabled so that the display voltage transmitted by the data line 330 can be applied to the first pixel electrode 352 and the second pixel electrode 354, and then the third scan line 316 is enabled so that the voltages of the first pixel electrode 352 and the second pixel electrode 354 can be redistributed.

Moreover, referring to FIGS. 5, 6, and 8, the first active device 342 is firstly turned on by the first scan line 312 and the display voltage is applied to the first pixel electrode 352 and the second pixel electrode 354 from the data line 330 according to the driving method of the pixel structure 300 in the 3D display mode. Next, the third active device 346 is turned on by the third scan line 316, so that the voltages of the first pixel electrode 352 and the second pixel electrode 354 are redistributed. Subsequently, the second active device 344 is turned on by the second scan line 314 such that the common voltage is applied to the second pixel electrode 354 from the first common electrode line 322.

Therefore, the first pixel electrode 352 is first applied by the display voltage and subsequently coupled with the display voltage of the second pixel electrode 354. The second pixel electrode 354 is first applied by the display voltage, subsequently coupled with the display voltage of the first pixel electrode 352, and then applied by the common voltage. Under the driving method, the first pixel electrode 352 continuously displays the predetermined image at a frame time, while the second pixel electrode 354 is applied by the display voltage only at a short time period of the frame time and applied by the common voltage at the other time period of the frame time. Accordingly, the second pixel electrode 354 substantially displays the dark image.

As a whole, the first pixel electrode 352 displays the predetermined image and the second pixel electrode 352 does not display the predetermined image in the 3D display mode. It is noted that the second pixel electrode 354 is located between the first pixel electrode 352 and the next or the previous pixel structure 300. Therefore, the second pixel electrode 354 can be served as a light shielding pattern in the 3D display mode to prevent from the occurrence of cross talk between stereo images. Additionally, the first pixel electrode 352 and the second pixel electrode 354 of the pixel structure 300 can both display the predetermined image in the 2D display mode, such that the pixel structure 300 has desirable display aperture ratio in the 2D display mode.

Figure 9:
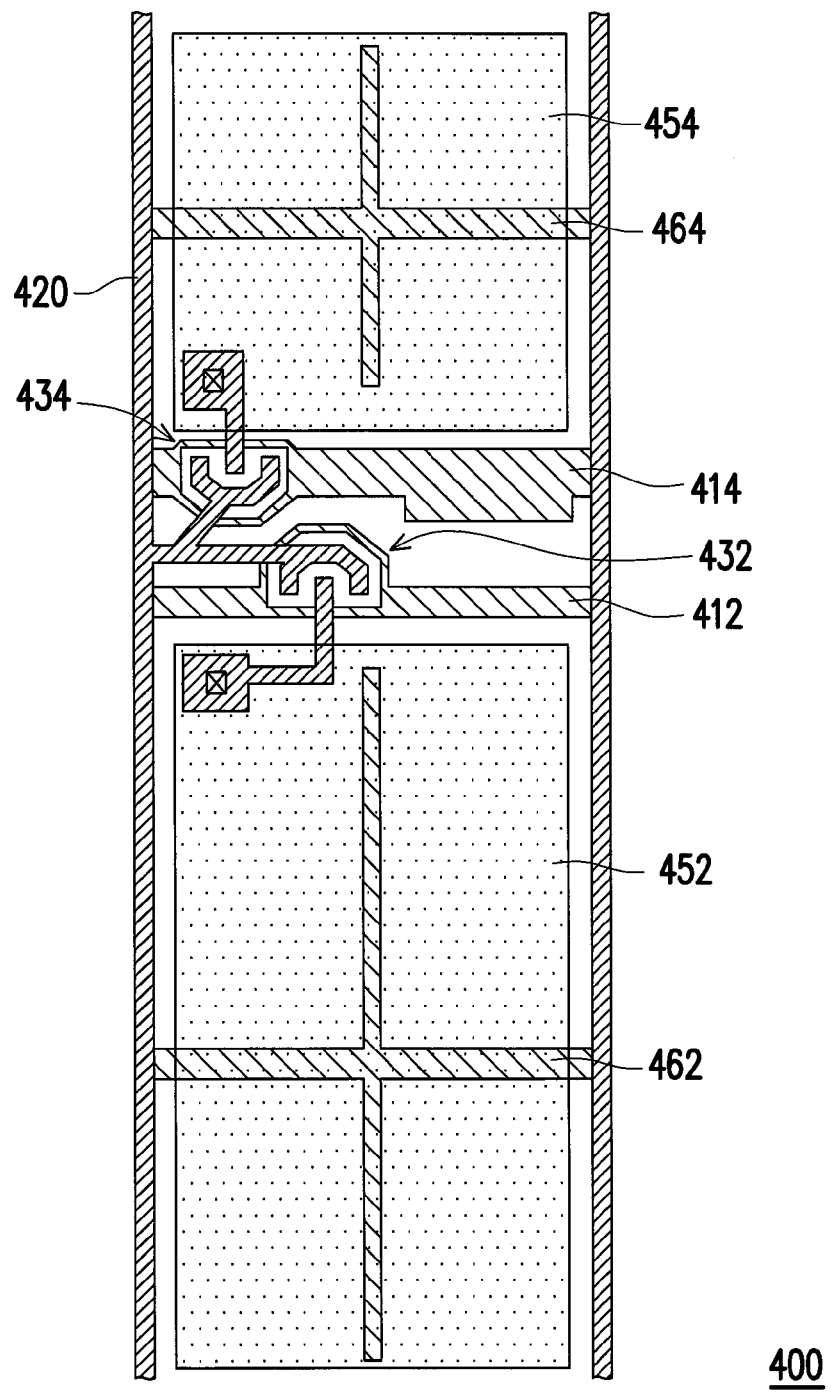
FIG. 9 is a schematic view of a pixel structure according to a third embodiment.

FIG. 9 is a schematic view of a pixel structure according to a third embodiment. Referring to FIG. 9, the pixel structure 400 includes a first scan line 412, a second scan line 414, a data line 420, a first active device 432, a second active device 434, a first pixel electrode 452, and a second pixel electrode 454. The data line 420 intersects with the first and the second scan lines 412 and 414. The first active device 432 is driven by the first scan line 412 and electrically connected to the data line 420. The second active device 434 is driven by the second scan line 414 and electrically connected to the data line 420. The first pixel electrode 452 is electrically connected to the data line 420 through the first active device 432 and the second pixel electrode 454 is electrically connected to the data line 420 through the second active device 434.

The first pixel electrode 452 and the second pixel electrode 454 in the pixel structure 400 are connected to the data line 420 through different active device 432 and 434, and the first active device 432 and the second active device 434 are controlled by different scan lines 412 and 414. Hence, the first pixel electrode 452 and the second pixel electrode 454 can have different display voltages. In the present embodiment, the pixel structure 400 further includes a first common electrode line 462 and a second common electrode line 464 which respectively overlap the first pixel electrode 452 and the second pixel electrode 454 to form the required storage capacitance.

Figure 10:
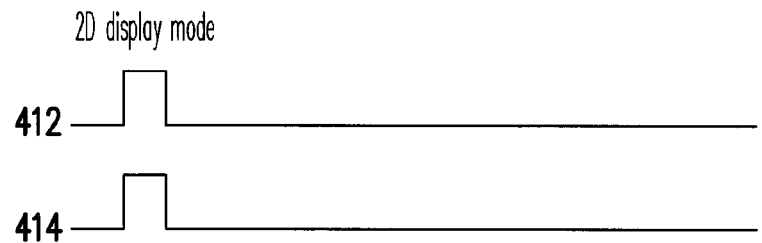
FIG. 10 is the driving waveform diagrams of the first scan line and the second scan line of the pixel structure in FIG. 9 in a 2D display mode.

FIG. 10 illustrates the driving waveform diagrams of the first scan line and the second scan line of the pixel structure in FIG. 9 in a 2D display mode. Referring to FIG. 9 and FIG. 10, the first active device 432 and the second active device 434 are turned on simultaneously by the first scan line 412 and the second scan line 414 in the 2D display mode according to the driving method of the pixel structure 400 so that the display voltage is applied to the first pixel electrode 452 and the second pixel electrode 454 from the data line 420. Namely, the first scan line 412 and the second scan line 414 are simultaneously enabled in the 2D display mode of the pixel structure 400, and the first pixel electrode 452 and the second pixel electrode 454 both display the predetermined image.

Figure 11A:
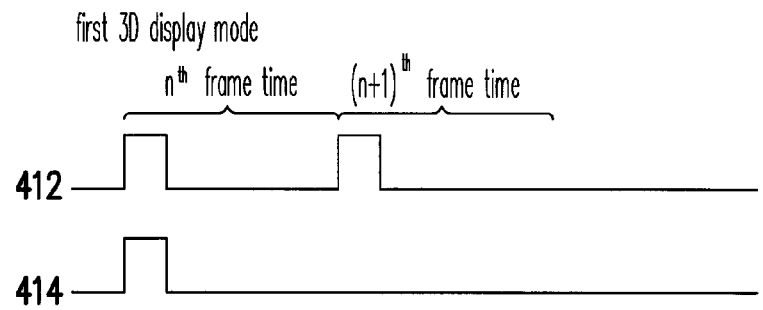
FIG. 11A is the driving waveform diagrams of the first scan line and the second scan line of the pixel structure in FIG. 9 in a first 3D display mode.

FIG. 11A illustrates the driving waveform diagrams of the first scan line and the second scan line of the pixel structure in FIG. 9 in a first 3D display mode. Referring to FIG. 9 and FIG. 11A, the first active device 432 and the second active device 434 are turned on by the first scan line 412 and the second scan line 414 at the $n^{th}$ frame time in the first 3D display mode according to the driving method of the pixel structure 400 so that the display voltage is applied to the first pixel electrode 452 and the second pixel electrode 454 from the data line 420. Moreover, one of the first scan line 412 and the second scan line 414 is enabled at the $(n+1)^{th}$ frame time. In the present embodiment, the first scan line 412 is, for example, enabled at the $(n+1)^{th}$ frame time. Accordingly, the first active device 432 is turned on at the $(n+1)^{th}$ frame time so that a dark voltage is applied to the first pixel electrode 452 from the data line 420 while the second active device 434 is not turned on, wherein the dark voltage can be a common voltage or a grounding voltage.

Namely, the first pixel electrode 452 in the pixel structure 400 can display the dark image and the second pixel electrode 454 displays the predetermined image in the first 3D display mode. As such, the first pixel electrode 452 can be served as the light shielding pattern to prevent from the occurrence of cross talk of stereo images. It is noted that the driving method of the pixel structure 400 which merely turns on the first active device 432 at the $(n+1)^{th}$ frame time in the first 3D display mode is taken as an example, but the invention is not limited thereto.

Additionally, the first pixel electrode 452 and the second pixel electrode 454 have a first refresh frequency in the 2D display mode according to the driving method of the pixel structure 400, for instance. In the first 3D display mode, the first pixel electrode 452 also has the first refresh frequency and the second pixel electrode 454 has a second refresh frequency, wherein the first refresh frequency is twice of the second refresh frequency. In other words, the refresh frequency of the second pixel electrode 454 is half of the refresh frequency of the first pixel electrode 452 in the first 3D display mode.

Figure 11B:
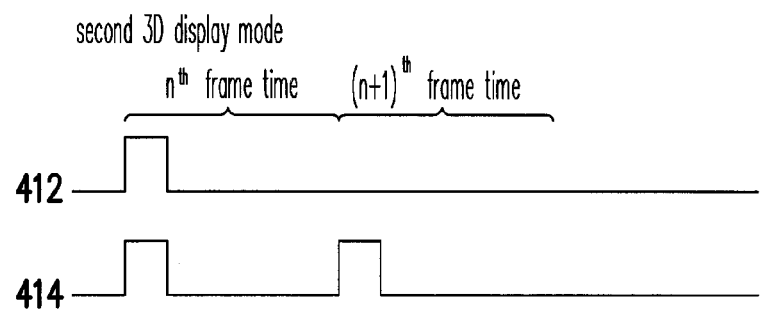
FIG. 11B is the driving waveform diagrams of the first scan line and the second scan line of the pixel structure in FIG. 9 in a second 3D display mode.

FIG. 11B illustrates the driving waveform diagrams of the first scan line and the second scan line of the pixel structure in FIG. 9 in a second 3D display mode. Referring to FIG. 9 and FIG. 11B, the first active device 432 and the second active device 434 are turned on by the first scan line 412 and the second scan line 414 at the $n^{th}$ frame time in the second 3D display mode according to the driving method of the pixel structure 400 so that the display voltage is applied to the first pixel electrode 452 and the second pixel electrode 454 from the data line 420. Moreover, only the second active device 434 is turned on at the $(n+1)^{th}$ frame time. Now, the dark voltage transmitted by the data line 420 is applied to the second pixel electrode 454 through the second active device 434 so that the second pixel electrode 454 displays the dark image, wherein the dark voltage can be the common voltage or the grounding voltage.

The first pixel electrode 452 and the second pixel electrode 454 have a first refresh frequency in the 2D display mode according to the driving method of the pixel structure 400, for instance. In the second 3D display mode, the second pixel electrode 454 also has the first refresh frequency and the first pixel electrode 452 has the second refresh frequency, wherein the first refresh frequency is twice of the second refresh frequency. In other words, the refresh frequency of the first pixel electrode 452 is half of the refresh frequency of the second pixel electrode 454 in the second 3D display mode.

Based on the first and the second 3D display modes, merely one of the first scan line 412 and the second scan line 414 can be selectively enabled at the $(n+1)^{th}$ frame time according to the 3D display mode of the pixel structure 400, such that merely one of the first active device 432 and the second active device 434 can be turned on. Herein, the dark voltage transmitted by the data line 420 can be applied to merely one of the first pixel electrode 452 and the second pixel electrode 454. Moreover, the other of the first active device 432 and the second active device 434 is not turned on at the $(n+1)^{th}$ frame time. Accordingly, the one of the pixel electrode 452 and the second pixel electrode 454 applied by the dark voltage can display the dark image to be served as the light shielding pattern to achieve the driving method of the present embodiment.

Figure 12:
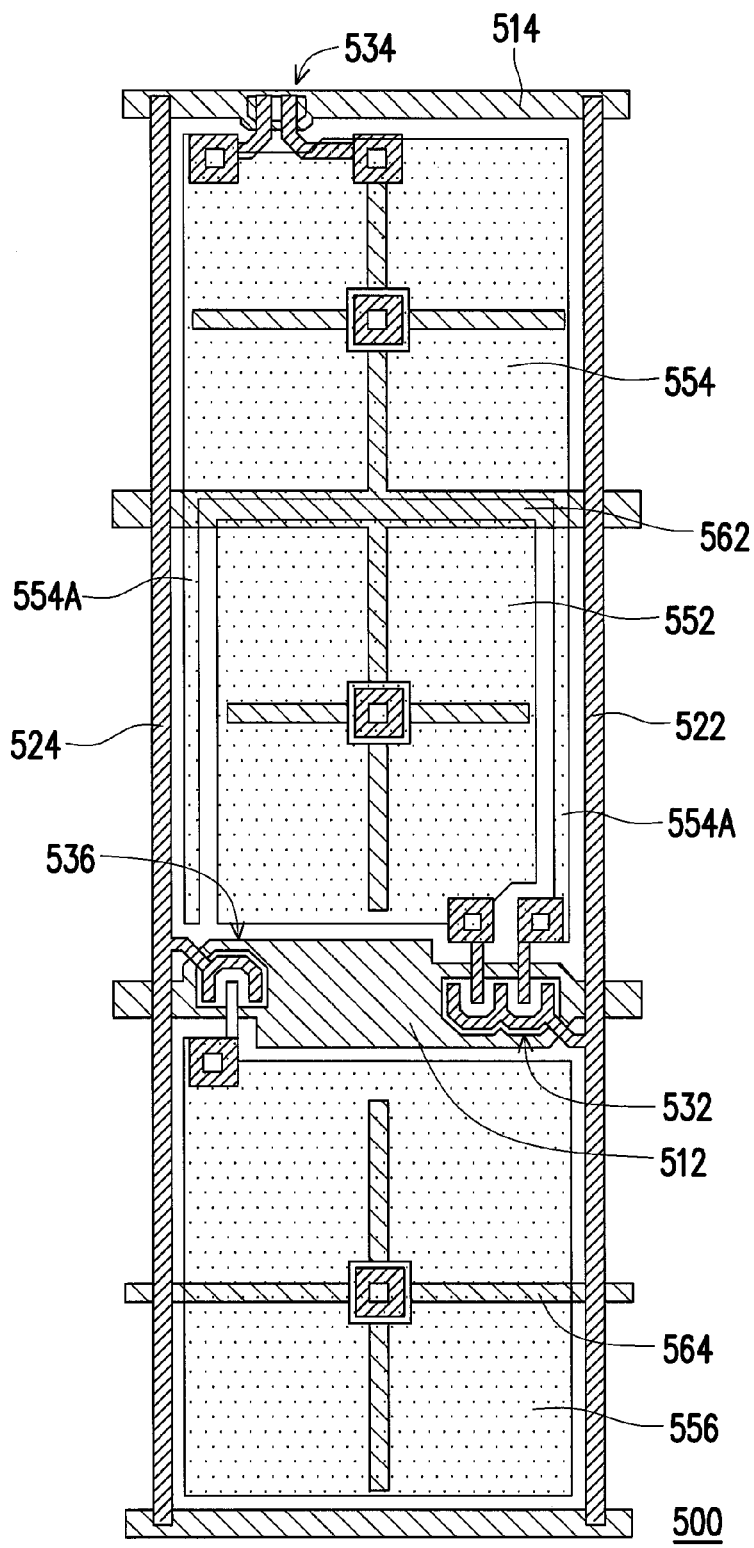
FIG. 12 is a schematic view of a pixel structure according to a fourth embodiment.

FIG. 12 is a schematic view of a pixel structure according to a fourth embodiment. Referring to FIG. 12, the pixel structure 500 includes a first scan line 512, a second scan line 514, a first data line 522, a second data line 524, a first active device 532, a second active device 534, a third active device 536, a first pixel electrode 552, a second pixel electrode 554, a third pixel electrode 556, a first common electrode line 562, and a second common electrode line 564.

The first and the second data lines 522 and 524 intersect with the first and the second scan lines 512 and 514. The first active device 532 is driven by the first scan line 512 and electrically connected to the first data line 522. The second active device 534 is driven by the second scan line 514 and electrically connected to the first common electrode line 562. The third active device 536 is also driven by the first scan line 512 and electrically connected to the second data line 524. The first pixel electrode 552 is electrically connected to the first data line 522 through the first active device 532. The second pixel electrode 524 is also electrically connected to the first data line 522 through the first active device 532 and electrically connected to the first common electrode line 562 through the second active device 534. The third pixel electrode 556 is electrically connected to the second data line 524 through the third active device 536.

The first pixel electrode 552, the second pixel electrode 554, and the third pixel electrode 556 are located between the first data line 522 and the second data line 524. The first pixel electrode 552 is located between the second pixel electrode 554 and the third pixel electrode 556. In addition, the first scan line 512 is located between the first pixel electrode 552 and the third pixel electrode 556, and the second scan line 514 is located at a side of the second pixel electrode 554 away from the first pixel electrode 552. For forming the required storage capacitance, the first common electrode line 562 overlaps the first pixel electrode 552 and the second pixel electrode 554 and the second common electrode line 564 overlaps the third pixel electrode 556, for instance. Furthermore, for connecting the second pixel electrode 554 with the first active device 532, the second pixel electrode 554 can has two extending portions 554A extending towards the first scan line 512, wherein the two extending portions 554A are respectively located between the first pixel electrode 552 and the first data line 522 and between the first pixel electrode 552 and the second data line 524.

Figure 13:
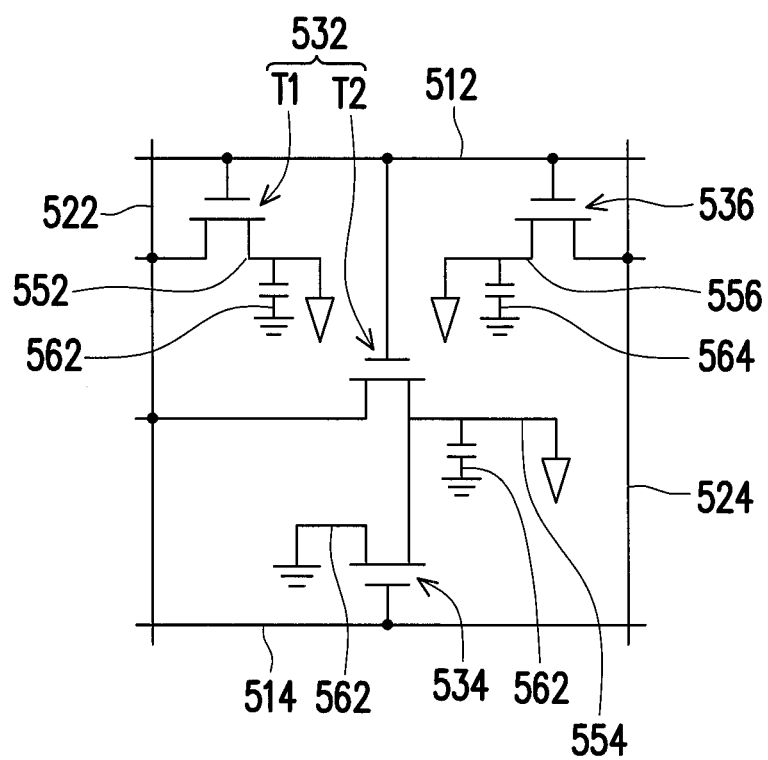
FIG. 13 is an equivalent circuit diagram of the pixel structure 500.

FIG. 13 illustrates an equivalent circuit diagram of the pixel structure 500. Referring to FIG. 12 and FIG. 13, the first active device 532 as shown in FIG. 13 is divided into the first transistor T1 and the second transistor T2, but the first active device 532 can be formed by a dual drain thin film transistor in other embodiments. The first pixel electrode 552 is electrically connected to the first data line 522 through the control of the first active device 532. The second pixel electrode 554 is electrically connected to the first data line 522 or the first common electrode line 562 through the control of the first active device 532 and the control of the second active device 534. The third pixel electrode 556 is electrically connected to the second data line 524 through the control of the third active device 536.

Accordingly, the voltage of the first pixel electrode 552 can be the voltage transmitted by the first data line 522, the voltage of the second pixel electrode 554 can be the voltage transmitted by the first data line 522 or the voltage transmitted by the first common electrode line 562, and the voltage of the third pixel electrode 556 can be the voltage transmitted by the second data line 524. Similar to the aforesaid embodiment, the first pixel electrode 552 and the second pixel electrode 554 can have the same voltage or different voltages, wherein the second pixel electrode 554 can be used for displaying the dark image when the first pixel electrode 552 and the second pixel electrode 554 have different voltages. The display voltage of the third pixel electrode 556 can be the same to or different from the voltages of the other two pixel electrodes or the same to the voltage of one of the other two pixel electrodes. During the 2D display mode of the pixel structure 500, the first pixel electrode 552, the second pixel electrode 554, and the third pixel electrode 556 can display the predetermined images. During the 3D display mode, the second pixel electrode 554 can display the dark image and the third pixel electrode 556 can selectively display the predetermined image or the dark image.

During the 2D display mode, the second active device 534 is turned on by the second scan line 514 first such that the second pixel electrode 554 is applied by the voltage transmitted by the first common electrode line 562. Next, the first scan line 512 is enabled to turn on the first active device 532 and the third active device 536. Herein, the display voltage transmitted by the first data line 522 can be simultaneously applied to the first pixel electrode 552 and the second pixel electrode 554, and the display voltage transmitted by the second data line 524 can be applied to the third pixel electrode 556. Hence, the first pixel electrode 552, the second pixel electrode 554, and the third pixel electrode 556 can display the predetermined images in the 2D display mode. It is noted that the voltages transmitted by the first data line 522 and the second data line 524 can be different. Accordingly, in the 2D display mode of the pixel structure 500, one pixel structure 500 can display two or more gray levels to eliminate the problems of gray scale inversion, color shift, or color washout at large view angle.

The adjacent two rows of the pixel structures 500 in the display panel are used for respectively displaying the left eye image and the right eye image when the pixel structure 500 is applied in the display panel performing the 3D display mode. The positions of the two rows of the pixel structures 500 are close so that the left eye and the right eye of the user may easily receive two images, i.e. the left eye image and the right eye image, simultaneously, which causes the problem of cross talk between stereo images. Therefore, at least one of the second pixel electrode 554 and the third pixel electrode 556 can selectively display the dark image in the present embodiment, which conduce to preventing from the phenomenon of the cross talk of stereo images.

In specific, the first active device 532 and the third active device 536 are turned on by the first scan line 512 in the 3D display mode. Herein, the first display voltage transmitted by the first data line 522 can be applied to the first pixel electrode 552 and the second pixel electrode 554. Also, the voltage transmitted by the second data line 524 can be applied to the third pixel electrode 556. If the second data line 524 transmits the dark voltage, the third pixel electrode 556 can display the dark image. If the second data line 524 transmits the second display voltage rather than the dark voltage, the third pixel electrode 556 can display the predetermined image. Next, the second active device 534 is turned on by the second scan line 512. Herein, the second pixel electrode 554 originally applied by the first display voltage is electrically connected to the first common electrode line 562 to have the common voltage. Accordingly, the image displayed by the second pixel electrode 554 is the dark image.

Owing that the second pixel electrode 554 and the third pixel electrode 556 are located at the periphery of the pixel structure 500, the second pixel electrode 554 and the third pixel electrode 556 both displaying the dark image can provide the light shielding effect between two adjacent rows of the pixel structures 500. Accordingly, the user would not feel cross talk between stereo images caused by the interference between the left eye image and the right eye image, which facilitates the improvement of the 3D display effect. The second pixel electrodes 554 in each row of the pixel structures 500 is adjacent to the third pixel electrodes 556 in the previous or the next row of the pixel structures 500 when the pixel structures 500 having similar layout are arranged in an array.

The second pixel electrodes 554 and the third pixel electrodes 556 can form a dark region with large area when the second pixel electrodes 554 and the third pixel electrodes 556 simultaneously display the dark image, which is further conducive to preventing cross talk between stereo images caused by the interference between the left eye image and the right eye image.

Certainly, the third pixel electrode 556 is not limited to display the dark image in the present embodiment. In one embodiment, the second data line 524 can transmit a second display voltage when the first scan line 512 is enabled. Therefore, the third pixel electrode 556 can display the predetermined image. Owing that the first pixel electrode 552 and the third pixel electrode 556 can receive the display voltages transmitted by the first data line 522 and the second data line 524 and the display voltages transmitted by the first data line 522 and the second data line 524 can be different, the resolution of the display panel applying the pixel structure 500 in the 3D display mode can be improved.

For example, in a conventional design, the even rows of the pixel structures and the odd rows of the pixel structures in the display panel are used for displaying the left eye image and the right eye image respectively with respect to the design of the patterned retarder for achieving the 3D display effect, and vice versa. Therefore, in a display panel having 1,080 rows of pixel structures, merely 540 rows of the pixel structures display the left eye image and the other 540 rows of the pixel structures display the right eye image. That is to say, the resolution of the 3D image is half of the design of the display panel.

Nevertheless, in the present embodiment, the first pixel electrode 552 and the third pixel electrode 556 in the same pixel structure 500 can display alternative gray levels, i.e. have different display voltage, in the 3D display mode. When the pixel structure 500 is used for displaying the left eye image, the first pixel electrode 552 and the third pixel electrode 556 can respectively display the left eye image of the $n^{th}$ row and the left eye image of the $(n+1)^{th}$ row. Similarly, the pixel structure 500 can display the right eye image of the $n^{th}$ row and the right eye image of the $(n+1)^{th}$ row when it is used for displaying the right eye image. As such, when the pixel structure 500 is applied in a display panel having 1080 rows of pixel structures, the left eye image and the right eye image in the 3D display mode can have the resolution of 1,080 rows. That is to say, the resolution is not reduced in the 3D display mode.

Furthermore, the first pixel electrode 552 and the third pixel electrode 556 in the same pixel structure 550 can display the images with different gray levels, i.e. have different display voltages, in the 3D display mode. The design of the present embodiment can selectively improve the display effect of the 3D display mode. For example, one pixel structure 500 can display one image with different gray levels, which facilitates to improve the problems of color shift, color washout, and the like at large view angle. Consequently, the application of the pixel structure 500 in the display panel is conducive to the enhancement of the display effect in the 3D display mode.

Figure 14:
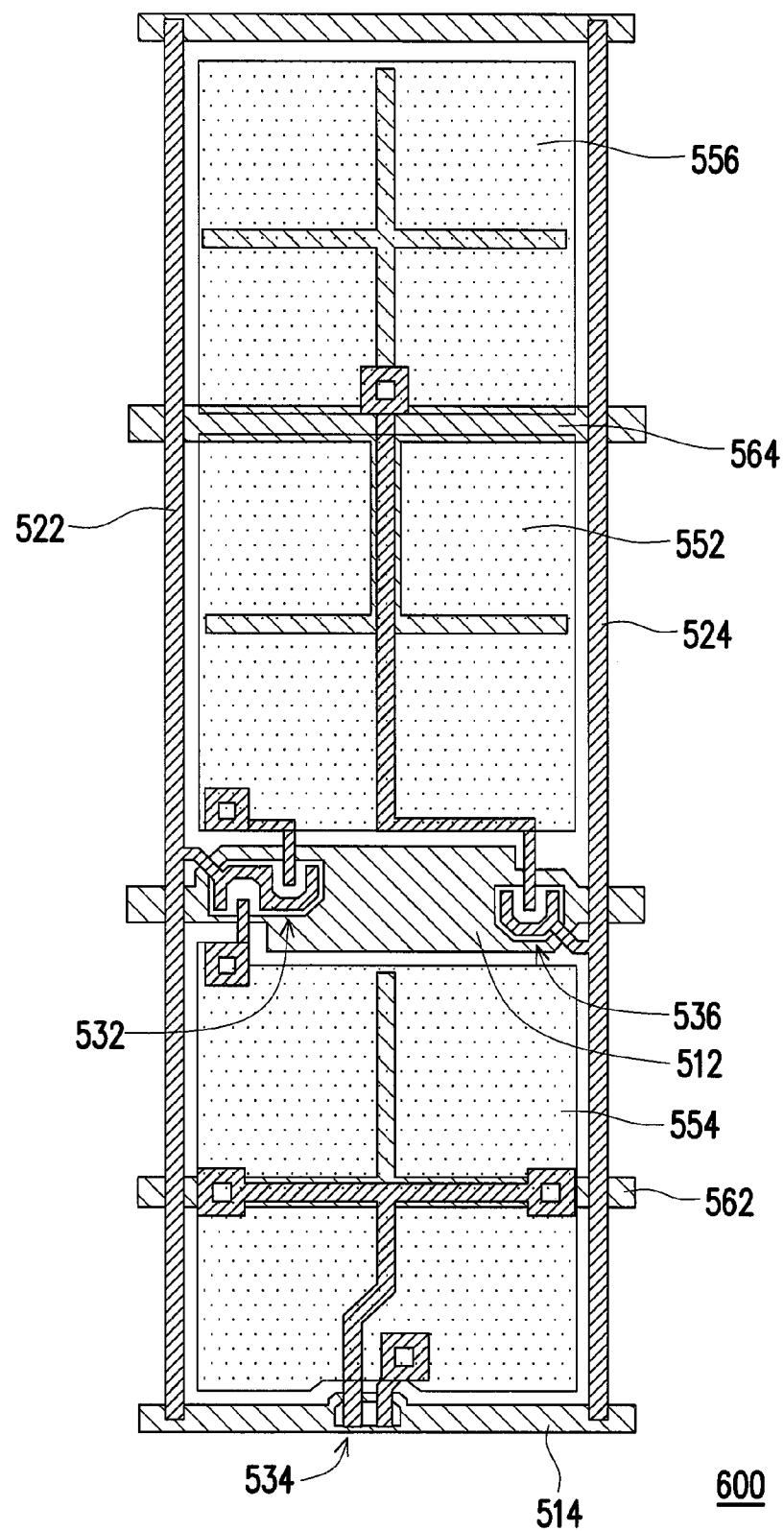
FIG. 14 is a schematic view of a pixel structure according to a fifth embodiment.

FIG. 14 is a schematic view of a pixel structure according to a fifth embodiment. Referring to FIG. 14, the components configured in the pixel structure 600 is substantially identical to those configured in the pixel structure 500, and the equivalent circuit diagram of the pixel structure 600 can be referred to that shown in FIG. 13. The difference between the present embodiment and the fourth embodiment mainly lies in that the relative positions of the components. In the pixel structure 600, the first scan line 512 is located between the first pixel electrode 552 and the second pixel electrode 554, and the third pixel electrode 556 is located at a side of the first pixel electrode 552 away from the first scan line 512. In addition, the first common electrode line 562 merely overlaps the second pixel electrode 554, and the second common electrode line 564 simultaneously overlaps the first pixel electrode 552 and the third pixel electrode 556.

Similar to the fourth embodiment, the first pixel electrode 552, the second pixel electrode 554, and the third pixel electrode 556 can display the predetermined images in the 2D display mode. Furthermore, the displayed gray level of the third pixel electrode 556 can be different from those of the first pixel electrode 552 and the second pixel electrode 554, thereby the problems of the gray scale inversion, the color shift, and the color washout at large view angle can be improved.

In the 3D display mode, the driving method of the pixel structure 600 is similar to that of the pixel structure 500 and is not iterated here. Accordingly, at least one of the second pixel electrode 554 and the third pixel electrode 556 can display the dark image so as to prevent from the interference between the left eye image and the right eye image. Namely, cross talk between stereo images can be improved.

Furthermore, the first pixel electrode 552 and the third pixel electrode 556 can have different display voltages in the 3D display mode. The displayed gray level of the third pixel electrode 556 can be different from that of the first pixel electrode 552 when the same image information is displayed, thereby the problems of the gray scale inversion, the color shift, and the color washout at large view angle can be reduced in the pixel structure 600. The image information displayed by the third pixel electrode 556 can be different from that displayed by the first pixel electrode 552, thereby the resolution of the display panel having the pixel structure 600 can be enhanced in the 3D display mode.

Figure 15:
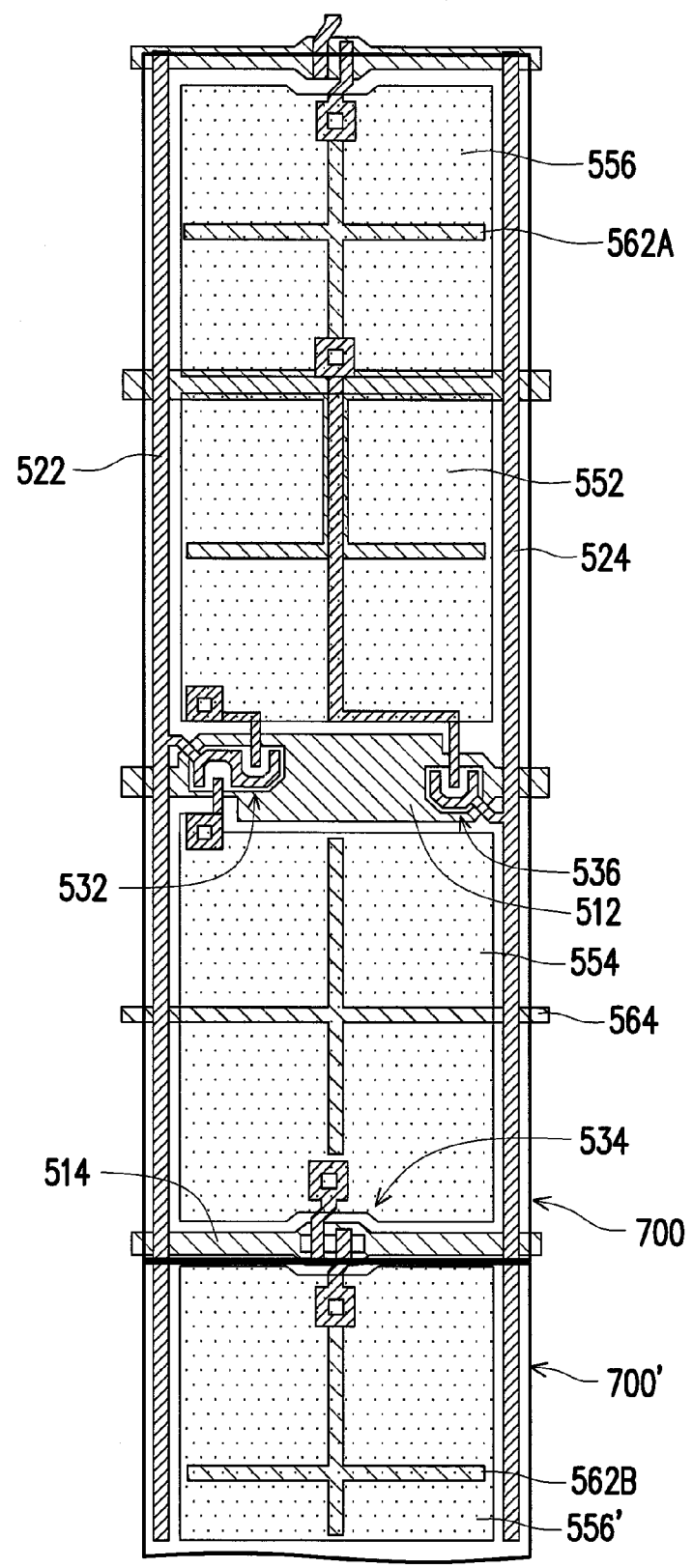
FIG. 15 is a schematic view of two adjacent pixel structures in a pixel array according to a sixth embodiment.

FIG. 15 is a schematic view of two adjacent pixel structures in a pixel array according to a sixth embodiment. Referring to FIG. 15, the pixel structure 700 and 700' are similar to the pixel structure 600. This embodiment is similar to the fifth embodiment, while the difference therebetween lies the dispositions of the first common electrode line 562A and 562B and the second common electrode line 564 and the connection of the second active device 534 and other components. In the present embodiment, the first common electrode line 562A overlaps the first pixel electrode 552 and the third pixel electrode 556, and the second common electrode line 564 overlaps the second pixel electrode 554. In addition, when a plurality of pixel structures 700 and 700' is arranged in an array to form a pixel array, the second active device 534 of the pixel structure 700 in the present embodiment is connected with the first common electrode line 562B of the previous or the next pixel structure 700'. In specific, two pixel structures 700 and 700' are shown to represent the pixel array in the present embodiment. However, persons who have ordinary skill in the art know that the pixel array can be formed by repeatedly arranging the pixel structures as shown in FIG. 7 in the row direction.

In the present embodiment, the second pixel electrode 554 can be electrically connected to the first common electrode line 562B configured in the previous or the next pixel structure 700' through the second active device 534, rather than connected to the second common electrode line 564 overlapping the second pixel electrode 554 itself. The first common electrode line 562B configured in the previous or the next pixel structure 700' overlaps the third pixel electrode 556' in the pixel structure 700' and further overlaps the first pixel electrode (not shown) of the pixel structure 700' to form the required storage capacitance. Similarly, the first common electrode line 562A overlapping the first pixel electrode 552 and the third pixel electrode 556 in the pixel structure 700 can be connected to the second pixel electrode of the adjacent pixel structure (not shown) through the corresponding active device (not marked). As such, the voltage in the second common electrode line 564 would not fluctuate due to the uneven current when the second electrode 554 is electrically connected to the first common electrode line 562B. Accordingly, the pixel structure 700 not only has the advantages of the pixel structure 600, but also has more stable display quality because the second pixel electrode 554 is not connected to the second common electrode line 564 overlapping the second pixel electrode 554 itself.

In light of the foregoing, the two pixel electrodes or the three pixel electrodes in the pixel structure according to the invention is driven by different active devices, such that the pixel electrodes can be applied by different voltages. In the 3D display mode, one pixel electrode in the pixel structure can display the dark image to be served as the light shielding pattern. In the 2D display mode, all the pixel electrodes can display the predetermined images. Accordingly, the area of the light shielding pattern is large enough to prevent from cross talk between stereo images of the pixel structure in the 3D display mode, and the pixel structure can have desirable display quality in 2D display mode because all the pixel electrodes can display the predetermined image. That is to say, the 2D display effect is not sacrificed for achieving desirable 3D display effect according to the invention. In addition, when the pixel structure has three pixel electrodes, the two pixel electrodes which do not display the dark image can have different display voltages in the 3D display mode. Accordingly, the 3D display resolution can be enhanced when the pixel structure according to the invention is applied to the display panel for performing the 3D display mode. On the other hand, the situations such as color shift and color washout at large angle in the 3D display mode can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel structure, comprising:
a first scan line;
a second scan line;
a first common electrode line having a main trunk and a branch;
a first data line intersecting with the first and the second scan lines;
a first active device driven by the first scan line and electrically connected to the first data line;
a second active device driven by the second scan line and electrically connected to the first common electrode line;
a first pixel electrode electrically connected to the first data line through the first active device; and
a second pixel electrode electrically connected to the first data line through the first active device and electrically connected to the first common electrode line through the second active device.

2. The pixel structure as claimed in claim 1, wherein the first pixel electrode is located between the second pixel electrode and a second pixel electrode of a previous or a next pixel structure.

3. The pixel structure as claimed in claim 1, wherein the first scan line and the second scan line are located between the first pixel electrode and the second pixel electrode.

4. The pixel structure as claimed in claim 1, wherein the first common electrode line overlaps the second pixel electrode.

5. The pixel structure as claimed in claim 4, wherein the main trunk is substantially parallel to the first scan line and connected with the branch, and the second active device is connected with a terminal of the branch.

6. The pixel structure as claimed in claim 1, further comprising a second common electrode line overlapping the first pixel electrode.

7. The pixel structure as claimed in claim 1, further comprising a third scan line and a third active device, the third active device is driven by the third scan line, and the third active device is electrically connected to the first pixel electrode and coupled with the second pixel electrode.

8. The pixel structure as claimed in claim 7, wherein the third scan line is a first scan line of a next pixel structure.

9. The pixel structure as claimed in claim 1, further comprising a second data line, a third active device, and a third pixel electrode, the third active device is driven by the first scan line and connected between the second data line and the third pixel electrode, and the first pixel electrode, the second pixel electrode, and the third pixel electrode are located between the first data line and the second data line.

10. The pixel structure as claimed in claim 9, wherein the first pixel electrode and the second pixel electrode are located between the first scan line and the second scan line, the first pixel electrode is located between the second pixel electrode and the first scan line, and the third pixel electrode and the first pixel electrode are located at two opposite sides of the first scan line.

11. The pixel structure as claimed in claim 10, wherein the second pixel electrode has two extending portions, the two extending portions extends toward the first scan line, and the two extending portions are respectively located between the first pixel electrode and the first data line and between first pixel electrode and the second data line.

12. The pixel structure as claimed in claim 10, wherein the first common electrode line overlaps the first pixel electrode and the second pixel electrode.

13. The pixel structure as claimed in claim 10, further comprising a second common electrode line overlapping the third pixel electrode.

14. The pixel structure as claimed in claim 9, wherein the first pixel electrode and the second pixel electrode are respectively located at two opposite sides of the first scan line, the first pixel electrode is located between the third pixel electrode and the first scan line, and the second pixel electrode is located between the first scan line and the second scan line.

15. The pixel structure as claimed in claim 14, wherein the first common electrode line overlaps the second pixel electrode.

16. The pixel structure as claimed in claim 14, further comprising a second common electrode line overlapping the first pixel electrode and the third pixel electrode.

17. A pixel array, comprising a plurality of pixel structures arranged in an array, and each of the pixel structures comprising:
a first scan line;
a second scan line;
a first common electrode line at least partially parallel to the first scan line and the second scan line;
a first data line intersecting with the first and the second scan lines;

a second data line intersecting with the first and the second scan lines;

a first active device driven by the first scan line and electrically connected to the first data line;

a second active device driven by the second scan line;

a third active device driven by the first scan line and electrically connected to the second data line;

a first pixel electrode electrically connected to the first data line through the first active device;

a second pixel electrode electrically connected to the first data line through the first active device; and a third pixel electrode electrically connected to the second data line through the third active device, wherein the first pixel electrode is located between the second pixel electrode and the third pixel electrode.

18. The pixel array as claimed in claim 17, wherein the second active device is connected to the second pixel electrode and the first common electrode line such that the second pixel electrode is electrically connected to the first common electrode line through the second active device.

19. The pixel array as claimed in claim 18, wherein the first common electrode line overlaps the first pixel electrode and the second pixel electrode.

20. The pixel array as claimed in claim 19, further comprising a second common electrode line overlapping the third pixel electrode.

21. The pixel array as claimed in claim 17, wherein the first common electrode line overlaps the second pixel electrode.

22. The pixel array as claimed in claim 21, further comprising a second common electrode line overlapping the first pixel electrode and the third pixel electrode.

23. The pixel array as claimed in claim 17, further comprising a second common electrode line, the first common electrode line overlapping the first pixel electrode and the third pixel electrode, the second common electrode line overlapping the second pixel electrode, and the second pixel electrode being electrically connected to a first common electrode line of a previous or a next pixel structure through the second active device.

* * * * *